United States Patent [19]

Osborn

[11] 3,741,499

[45] June 26, 1973

[54] CLUTCH ARRANGEMENT FOR TAPE TRANSPORT

[75] Inventor: Lloyd Osborn, Fort Wayne, Ind.

[73] Assignee: V-M Corporation, Benton Harbor, Mich.

[22] Filed: Sept. 20, 1971

[21] Appl. No.: 182,071

[52] U.S. Cl. .............. 242/201, 74/216.5, 74/242.15

[51] Int. Cl. ........................ B11b 15/32, G03b 1/04

[58] Field of Search .................... 242/191, 200, 201, 242/206–210, 67.4; 74/216.5–218, 242, 242.05, 242.8–242.15; 179/100.2 R

[56] References Cited

UNITED STATES PATENTS

| | | | |
|---|---|---|---|
| 2,705,262 | 3/1955 | Post et al. | 179/100.2 R |
| 3,419,686 | 12/1968 | Rhodes | 179/100.2 R |
| 3,465,357 | 9/1969 | Anderson | 242/191 |
| 3,495,789 | 2/1970 | Gerfast | 242/201 |

FOREIGN PATENTS OR APPLICATIONS

| | | | |
|---|---|---|---|
| 1,128,937 | 4/1962 | Germany | 242/201 |

*Primary Examiner*—Leonard D. Christian
*Attorney*—Johnson, Dienner, Emrich, Verbeck & Wagner

[57] ABSTRACT

A clutch arrangement for use with belt driven tape supply and take-up reels wherein the clutch is effective to provide a controlled drive torque on the take-up reel and no torque on the supply reel over a wide range of speed ratios between the reels and a reel drive pulley. The clutch is operative to provide a substantially constant drive torque during bi-directional rotation of the reels.

14 Claims, 3 Drawing Figures

INVENTOR
LLOYD OSBORN
BY Johnson, Dienner, Emrich, Verbeck & Wagner ATTORNEYS

INVENTOR
LLOYD OSBORN
BY Johnson, Dienner, Emrick,
Verbeck & Wagner ATTORNEYS

CLUTCH ARRANGEMENT FOR TAPE TRANSPORT

BACKGROUND OF THE INVENTION

The present invention relates generally to tape transport apparatus, and more particularly to a novel clutch arrangement for use with bi-directional belt driven tape supply and take-up reels whereby a substantially constant drive torque is effected for the take-up reel over a wide range of reel speeds.

It is known in tape transport devices, such as in magnetic tape recorders and the like, to transfer a flexible tape between supply and take-up reels by effecting rotational driving of a tape take-up through an endless belt supported about a reel mounting hub and a reel drive pulley. In bi-directional operated tape transport devices wherein the tape may be transferred in a forward direction and than reversed to be rewound on the supply reel, the tape supply and take-up reels alternate to supply and take-up the tape as during "play" and "rewind" modes of operation. The driven reel drive pulley may be connected to both the take-up reel hub and the supply reel hub through loosely fitting belts, with clutch means being provided to tension one of the belts to effect driving of the associated hub, the remaining hub being free to rotate substantially independently of its loosely fitting belt. In tape transport devices which vary the rotational speed ratio between the reel drive pulley and the reel mounting hub, as between the normal "play" mode of operation and a "fast-forward" or "rewind" mode of operation, the clutch means should be capable of applying a substantially constant torque on the corresponding drive belt sufficient to establish driving relation of the associated hub but not so great as to overload the reel drive pulley or the reel mounting hub. The present invention satisfies the need for a clutch arrangement wherein a substantially constant torque or tension is applied to the drive belt of the reel mounting hub being driven in a take-up mode, the clutch operating equally for bi-directional operation of the transport device and providing the constant torque over a wide range of rotational speed ratios.

SUMMARY OF THE INVENTION

In accordance with the present invention, a capstan drive pulley is fixed on the drive shaft of a bi-directional drive motor. A reel drive pulley is mounted axially above the capstan drive pulley and is driven thereby through first annular friction pad clutch means. The reel drive pulley is interconnected to supply and take-up reel mounting hubs through loosely fitting belts which may be selectively tensioned or tightened to effect rotation of the associated reel hub. An idler arm is supported above the reel drive pulley for rotation about the axis of the drive pulley and carries a roller selectively engageable with either of the hub drive belts. Second annular friction pad clutch means interconnect the idler arm to the reel drive pulley so that a rotational torque is applied to the idler arm during rotation of the reel drive pulley. The first friction clutch means is established to effect a greater torque on the reel drive pulley than the torque applied to the idler arm by the reel drive pulley. During operation, the idler arm is rotated so that its roller engages the drive belt associated with the take-up reel and tensions the belt sufficiently to effect rotation of the take-up reel, the supply reel hub belt remaining loose so as not to interfere with rotation of the supply reel. Adjustment means are provided to selectively vary the downward force of the idler arm on the second friction clutch means and thus vary the torque between the reel drive pulley and the idler arm. In this manner, the idler arm senses the direction of rotation of the reel drive pulley and always tensions the belt corresponding to the tape take-up reel.

Accordingly, one of the primary objects of the present invention is to provide in a tape transport device a clutch arrangement wherein the clutch is operative to effect selective driving relation between a drive pulley and tape supply and take-up reel mounting hubs, the clutch being adapted to establish substantially constant driving torque to the take-up reel hub during bi-directional transfer of the tape.

Another object of the present invention is to provide a tape transport drive clutch arrangement wherein a reel hub drive pulley is connected to a capstan drive pulley through first clutch means, and the reel drive pulley is connected to a reel drive belt tensioning member through second clutch means so as to tension the drive belt of the reel to be operated as the take-up reel, the torque applied to the real drive pulley always being greater than the torque applied to the belt tensioning member.

Another object of the present invention is to provide a clutch arrangement as described wherein the drive belt tensioning member includes an idler arm which carries a roller engageable with either of a pair of loosely fitting belts coupling the reel drive pulley to supply and take-up reel mounting hubs, the idler arm sensing the direction of rotation of the reel drive pulley and being rotated to tension the belt acting on the take-up reel hub sufficiently to rotate the associated reel hub.

Still another object of the present invention is to provide a clutch arrangement as described wherein adjustment means are operative to selectively vary the rotational torque applied to the idler arm by the reel drive pulley.

Further objects and advantages of the present invention, together with the organization and manner of operation thereof, will become apparent from the following detailed description of one embodiment of the invention when taken in conjunction with the accompanying drawings wherein like reference numerals designate like parts throughout the several views.

DESCRIPTION OF A PREFERRED EMBODIMENT

Figure 1:
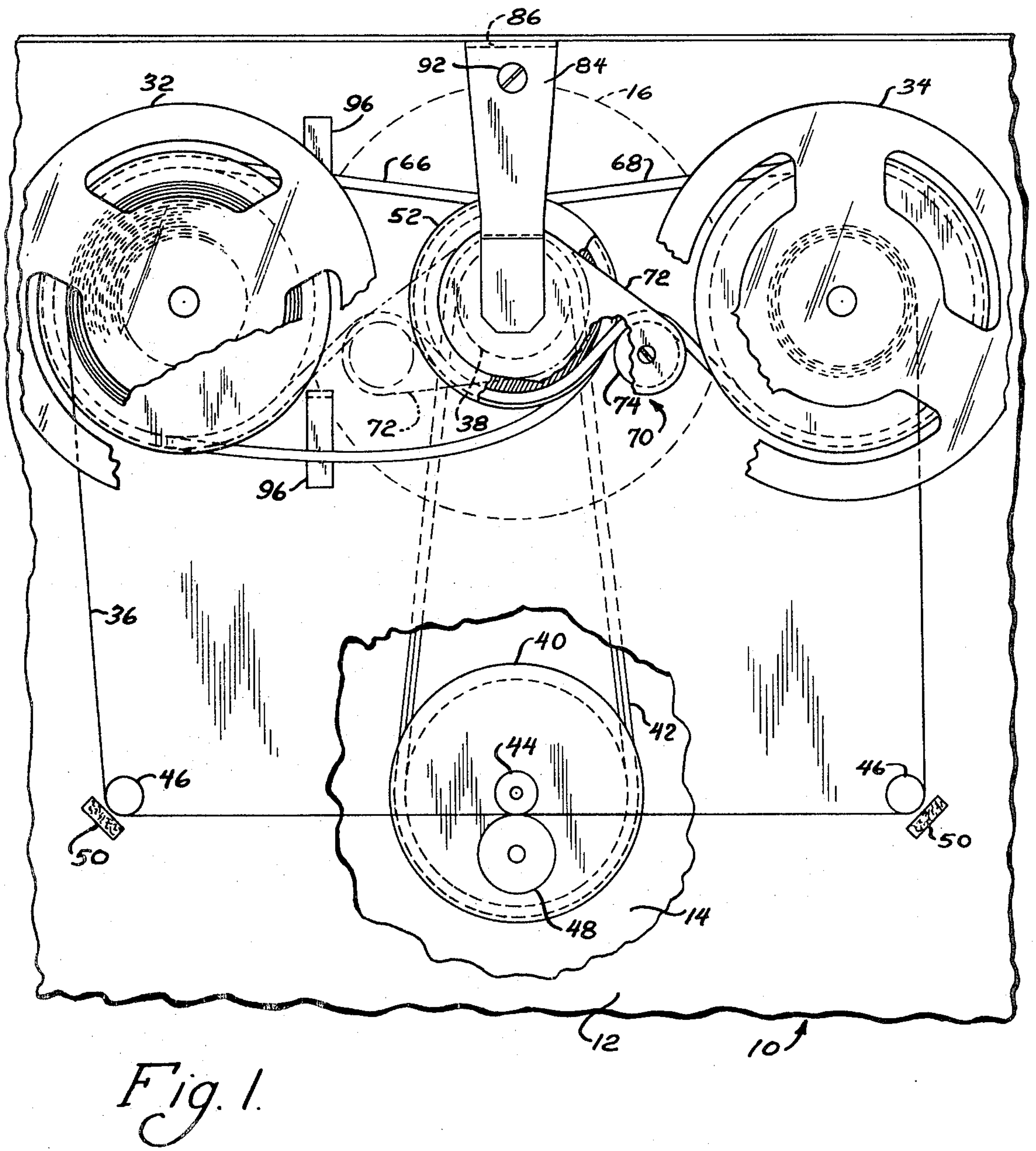
FIG. 1 is a partial plan view of a tape recorder employing a bi-directional clutch arrangement in accordance with the present invention, portions of the recorder being broken away to better illustrate elements of the invention.
Figure 2:
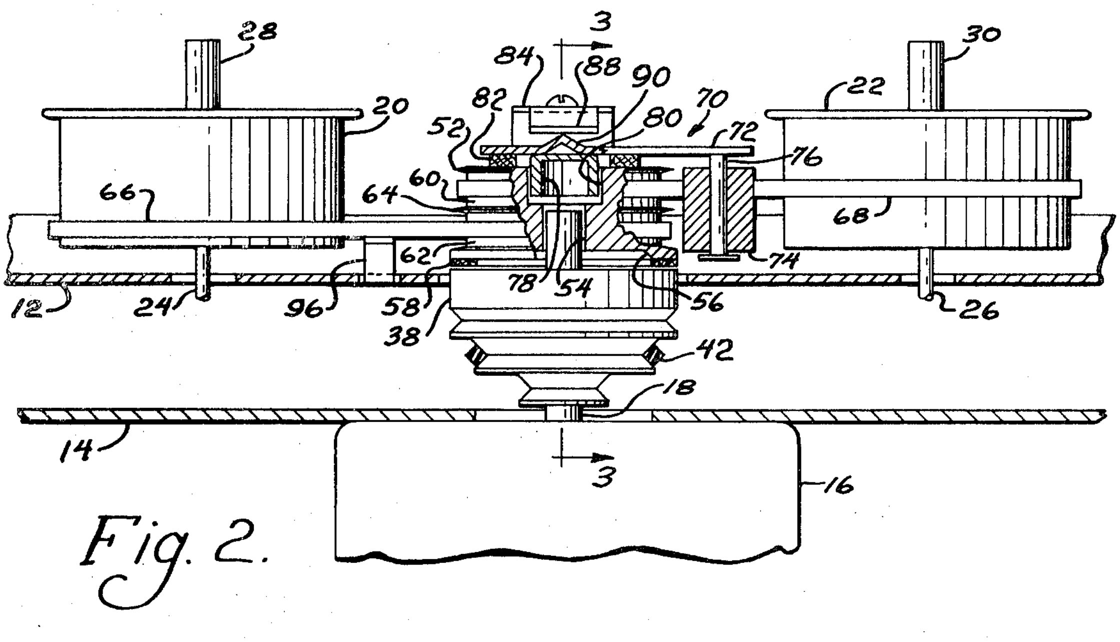
FIG. 2 is a partial vertical sectional view illustrating the belt tensioning member in cooperating relation with the reel drive pulley and one of the reel drive belts, with the tape reels moved from the reel mounting hubs and with some of the elements shown in elevation.

Referring now to the drawings, and in particular to FIGS. 1 and 2, one embodiment of the present invention is illustrated, by way of example, embodied in a tape recorder or tape transport apparatus indicated generally at 10. The tape recorder or transport 10 is of generally conventional construction and includes a substantially horizontal base plate 12 below which is supported a parallel support plate 14, both the base plate 12 and support plate frame being secured to a main chassis or frame structure (not shown) in a suitable manner. The support plate 14 supports a bi-directional electric drive motor 16 which has an output drive shaft 18 extending upwardly through the support plate 14 such that its uppermost end extends above the plane of the base plate 12.

A pair of spaced tape reel mounting or supporting hubs 20 and 22 are rotatably supported above the base plate 12 on hub shafts 24 and 26, respectively, which, in turn, are suitably secured to the base plate 12 by attaching means (not shown). The upper ends 28 and 30 of the hub support shafts 24 and 26, respectively, are adapted to receive tape supporting reels 32 and 34 thereon for rotation with the associated support mounting hubs 20 and 22, the tape reels 32 and 34 being of conventional design and serving alternately as supply and take-up reels for a flexible magnetic tape 36 as is known. For purposes of the present description, the tape reel 32 will be referred to as the tape supply reel, while the reel 34 will be referred to as the tape take-up reel, it being understood that when the tape is transferred from reel 34 to the reel 32, the reel 32 becomes the take-up reel.

The drive shaft 18 of the drive motor 16 has a stepped capstan drive pulley 38 fixedly secured thereon which is coupled in driving relation with a capstan pulley 40 through an endless drive belt 42. The capstan pulley 40 is suitably supported above the support plate 14 in coplanar relation with the capstan drive pulley 38 and has its annular periphery provided with stepped grooves in reverse order to those of the capstan drive pulley 38 to allow changes in speed ratio between the pulleys 38 and 40 through changing the position of the drive belt 42 as is known. The capstan pulley 40 supports a capstan roller 44 for rotation about the axis of the capstan pulley 40, the capstan 44 being disposed in coplanar relation with the tape reels 32 and 34 such that the magnetic tape 36 may be guided over laterally spaced guide rollers 46 for engagement with the capstan. A pressure roller 48 may be supported by the base plate 12 for movement against the magnetic tape 36 to effect driving relation between the capstan 44 and the tape in a known manner. Felt pads 50 are preferably supported to lightly urge the tape 36 against the guide rollers 46 to assist in maintaining the magnetic tape 36 on a substantially fixed path between the tape reels 32 and 34.

Noting FIG. 2, a reel drive pulley 52 is freely rotatably supported on the upper end of the motor drive shaft 18 in axial relation above the capstan drive pulley 38. To this end, the reel drive pulley 52 has an axial bore 54 which is slightly greater than the diameter of the motor shaft 18 so as to allow free rotation of the reel drive pulley on the motor shaft. The surface of the reel drive pulley 52 adjacent the upper surface of the capstan drive pulley 38 is undercut at 56 leaving an annular end surface on the reel drive pulley for engagement with first friction clutch means comprising an annular felt friction pad or washer member 58 which is interposed between the upper surface of the capstan drive pulley and the lower opposite surface of the reel drive pulley. For purposes of illustration, the annular friction member 58 is shown as being spaced slightly above the upper surface of the capstan drive pulley 38. It will, however, be understood that the friction clutch member 58 would engage the upper surface of the capstan drive pulley 38 by virtue of the weight of the reel drive pulley 52 acting downwardly thereon is an unrestricted manner. The annular friction member 58 could be secured to either the capstan drive pulley 38 or the reel drive pulley 52 so long as the friction washer is freely frictionally slideable on the surface to which it is not secured.

The annular peripheral surface of the reel drive pulley 52 is divided into upper and lower belt driving surfaces 60 and 62 separated by an annular radial flange 64. Endless belts 66 and 68 of identical length are loosely supported by and about the annular surfaces of the reel mounting hubs 20 and 22 and the driving surfaces 60 and 62 of the reel drive pulley 52, the belt 66 being loosely supported about the reel mounting hub 20 and the lower drive surface 62 while the belt 68 is loosely supported about the reel mounting hub 22 and the upper surface 60 of the reel drive pulley. Both of the belts 66 and 68 are of a length such that when supported on their associated reel mounting hubs and the reel drive pulley they will normally slip and thereby be ineffective to establish rotational driving of the corresponding reel mounting hub upon rotation of the reel drive pulley 52 when the corresponding tape reel is acting as a tape supply reel, as shown by belt 66 in FIG. 1.

The present invention is directed primarily to a clutch arrangement in the form of a belt tensioning or tightening mechanism, indicated generally at 70, which is operative to effect selective tensioning of either of the belts 66 and 68 to establish rotational driving relation between the reel drive pulley 52 and the corresponding reel mounting hub. As will become apparent hereinbelow, the belt tightening or tensioning arrangement 70 is operative to tension, and thereby effect driving relation through, the drive belt disposed about the reel mounting hub intended as the tape take-up hub, thereby establishing the tape tensioning arrangement as being bi-directional in operation in response to sensing of the direction of rotation of the reel drive pulley 52.

The clutch arrangement or belt tensioning mechanism 70 includes a pivotally mounted belt tensioner member comprising an idler arm 72 which carries a belt engaging roller 74 on a roller support pin 76 affixed to the idler arm 72 in normal relation thereto, the roller support pin having an enlarged heat portion providing vertical support for the rotatable belt engaging roller. The idler arm 72 is rotatable about the axis of rotation of the reel drive pulley 52. To this end, the idler arm 72 has an inverted cup-shaped member 78 secured thereto which is slidingly received within a cylindrical bore 80 in the reel drive pulley 52 such that the idler arm is freely rotatable within the bore 80. A second friction clutch means comprising an annular felt friction pad or washer member 82 is disposed between the upper surface of the reel drive pulley 52 and the opposing lower surface of the idler arm 72 to establish limited rotation of the idler arm in the direction of rotation of the reel drive pulley 52. The mean diameter and horizontal contact surface areas of the annular felt friction member pad 82 are smaller than the mean diameter and effective contact surface areas of the annular felt friction pad 58 so that the reel drive pulley will always have a higher drive torque applied thereto from the capstan drive pulley 38 through clutch means 58 than the rotational drive torque applied to the idler arm 72 by the reel drive pulley 52 through clutch means 82.

Figure 3:
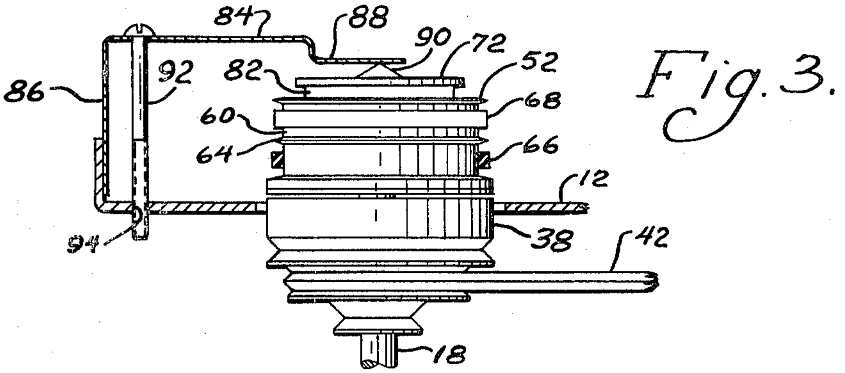
FIG. 3 is a partial vertical sectional view taken substantially along the line 3—3 of FIG. 2, but with the reel and capstan drive pulleys being shown in elevation.

The clutch arrangement or belt tensioning arrangement 70 includes adjustment means operative on the idler arm 72 to selectively vary the downward force of the idler arm on the friction member 82 and correspondingly vary the downward force of the reel drive pulley 52 against the annular friction member 58 interposed between the reel drive pulley and the capstan drive pulley 38. Noting FIG. 3, such adjustment means comprises a clutch spring 84 having a downwardly depending leg portion 86 suitably secured, as by welding, to an upturned flange on the base plate 12. The clutch spring 84 has an end portion 88 which overlies the center portion of the reel drive pulley 52 and is engageable with an upwardly directed conical abutment 90 formed on the idler arm 72. The clutch spring 84 may be made of a metallic spring material, or other suitable material, and has a configuration such that the end 88 is normally disposed in spaced relation above the conical abutment 90 of the idler arm 72 when the clutch spring is initially secured to the upstanding flange of the base plate 12 during assembly. An adjustment screw 92 is received through a suitable opening in the clutch spring 84 and has its lower threaded end portion threadedly received through a threaded opening 94 in the base plate 12 so that rotation of the adjustment screw will bring the end portion 88 of the clutch spring downwardly against the conical abutment 90.

In operation, with the capstan drive pulley 38, the reel drive pulley 52, the annular friction clutch pads 58 and 82, and the idler arm 72 and its associated belt engaging roller 74 being assembled with the drive belts 66 and 68 as shown in FIGS. 1 and 2, rotational movement of the motor drive shaft 18 and capstan drive pulley 38 in a counter-clockwise direction, as considered in FIG. 1, will effect counter-clockwise rotation of the reel drive pulley 52 and establish through the friction clutch pad 58 the tape reel 34 as the tape take-up reel while the tape reel 32 will operate as the tape supply reel.

As the reel drive pulley 52 is rotated, a corresponding rotational movement is imparted to the idler arm 72 through the friction clutch pad 82 to move the belt engaging roller 74 in a counter-clockwise direction whereupon it engages and tensions the drive belt 68. The clutch spring 84 is adjusted through the adjustment screw 92 to establish a rotational torque on the idler arm 72 only sufficient to tension the belt 68 and effect driving relation between the reel drive pulley 52 and the reel mounting hub 22. Adjustment of the clutch spring 84 supplies the downward force on the assembly and thereby selectively establishes the torque transmitted to the idler arm 72. As the downward force applied by the clutch spring 84 also acts against the capstan drive pulley 38, adjustment of the clutch spring 84 can also be used to control the speed of drive motor 16 which in turn controls the rate of tape travel during the "play" mode of operation through controlling rotation of the capstan 44. During rotational driving of the reel mounting hub 22, the reel mounting support hub 20 has no torque applied thereto by the associated drive belt 66 so that the tension in the belt 66 during the "play" mode of operation does not change.

It has been found that with the bi-directional clutch arrangement 70 in accordance with the present invention, the substantially "free wheeling" reel mounting hub supporting the tape supply reel allows the take-up reel to be driven at a proper speed through the torque applied to the idler arm 72 whether the record player is played in a normal forward "play" mode or operated in a "fast-forward" or "re-wind" mode, it being understood that during the "fast-forward" or "re-wind" mode of operation the pressure roller 48 is removed from engagement with the capstan 44. It has further been found that with the bi-directional torque limiting clutch arrangement in accordance with the present invention, a substantially uniform torque will be applied against either of the drive belts when tensioning thereof throughout a wide range of speed ratios between the reel drive pulley 52 and either of the reel mounting hubs 20 or 22. Such varying speed ratios would be encountered when changing from the "play" mode of operation to either the "fast-forward" or "re-wind" mode of operation.

In similar fashion, it can be seen that with the bi-directional motor 16 being energized in a manner to rotate the capstan drive pulley 38 in a clockwise direction, as considered in FIG. 1, the idler arm 72 of the belt tensioning arrangement 70 will be caused to rotate in a clockwise direction and assume the position shown in phantom in FIG. 1 wherein the belt engaging roller 74 engages and tensions the drive belt 66 to establish the reel mounting support hub 20 as the take-up reel drive while allowing substantially free rotation of the reel 34 as the tape supply reel.

Preferably, a pair of belt support members 96 are supported by the base plate 12 to underlie the belt 66 intermediate the reel drive pulley 52 and the reel mounting hub 20, and thereby prevent downward sliding of the drive belt 66 off the reel mounting hub 20 when the belt 66 is in its loose state.

While the bi-directional controlled torque clutch arrangement in accordance with the present invention has been described in conjunction with a tape recorder, the basic inventive concept may be readily applied to other tape transport devices. Having thus described a preferred embodiment of the present invention, it will be understood to those skilled in the art that changes and modifications may be made therein without departing from the invention in its broader aspects.

I claim:

1. In a tape recorder having a take-up reel and a supply reel, a rotatable reel drive pulley, first and second slipping belts for drivingly connecting said reel pulley to the take-up and supply reels respectively, a pivotally supported arm having belt engagement means, and slip clutch means between said reel pulley and arm such that when the reel pulley is rotated in one direction the belt engagement means will move therewith into position to tension the first belt and when the reel pulley is rotated in the opposite direction the belt engagement means will move therewith into position to tension the second belt.

2. A tape recorder as defined in claim 1 wherein said arm is supported for pivotal movement about the axis of rotation of said drive pulley, and wherein said slip clutch means comprises a friction member carried by said drive pulley and slidingly engageable with said arm.

3. A tape recorder as defined in claim 2 including adjustment means operative on said arm to vary the torque applied to said arm by said slip clutch means.

4. A tape recorder as defined in claim 1 wherein said arm is supported for pivotal movement about the axis of rotation of said reel drive pulley, and wherein said belt engagement means comprises a roller carried by said arm, said roller being caused to selectively tension either of said first and second belts for driving the associated reel dependent upon the direction of rotation of said reel drive pulley.

5. A tape recorder as defined in claim 1 including a drive motor, capstan drive pulley means rotatably connected to said drive motor, and friction clutch means interconnecting said capstan drive pulley and said reel drive pulley, said friction clutch means being adapted to establish a higher driving torque on said reel drive pulley than the torque applied to said arm by said slip clutch means.

6. A tape recorder as defined in claim 5 including adjustment means operative to vary the driving torque between said reel drive pulley and said arm, and between said capstan drive pulley and said reel drive pulley.

7. In a tape recorder having a take-up reel mounting hub and a supply reel mounting hub, the combination of a reel drive pulley, a belt loosely fitting about said reel drive pulley and one of said reel mounting hubs, a pivotally mounted belt tensioner member, and friction clutch means disposed between said reel drive pulley and said pivotally mounted belt tensioner member adapted to pivot said belt tensioner member into engagement with the belt to tighten the same when the reel drive pulley is rotated in one direction so as to effect rotation of said one of said reel mounting hubs through said belt with said rotation of the reel drive pulley.

8. The combination of claim 7 wherein said belt tensioner member includes an idler arm supported for pivotal movement about the axis of rotation of said reel drive pulley, said friction clutch means frictionally engaging said idler arm and said reel drive pulley to effect rotation of said idler arm in the direction of rotation of said reel drive pulley, said idler arm having a roller thereon engageable with the belt to tension the same upon rotation of said reel drive pulley in said one direction.

9. The combination of claim 8 including adjustment means operative on said roller arm for varying the driving frictional relation between said reel drive pulley and said arm.

10. In a tape recorder having a take-up reel supporting hub and a supply reel supporting hub, the combination of a rotatable reel drive pulley and a belt loosely fitting about said reel drive pulley and one of said hubs, a motor-driven capstan drive pulley on one side of said reel drive pulley and a pivotally mounted belt tensioner member on the other side of said belt drive pulley, a first friction clutch means between said reel drive pulley and capstan drive pulley such that the reel drive pulley rotates with rotation of the capstan drive pulley, and a second friction clutch means disposed between the reel drive pulley and the pivotally mounted belt tensioner member such that in one direction of rotation of the reel drive pulley the belt tensioner member moves into engagement with the belt to effect rotation of said one of said reel supporting hubs through said belt with rotation of the reel drive pulley in said one direction.

11. The combination of claim 10 wherein said first friction clutch means is adapted to apply a greater rotational torque to said reel drive pulley from said capstan drive pulley than the torque applied to said belt tensioner member by said second friction clutch means.

12. The combination of claim 11 wherein said reel drive pulley and said capstan pulley are axially aligned, and wherein said belt tensioner member includes an idler arm supported for rotation about the rotational axis of said reel drive pulley, said first friction clutch means comprising an annular friction member engaging said capstan and reel drive pulleys, said second friction clutch means comprising an annular friction member engaging said reel drive pulley and said idler arm and establishing a smaller torque on said idler arm than the torque applied by said first friction clutch means to said reel drive pulley.

13. The combination of claim 12 including adjustment means operative on said idler arm to vary the torque applied by said first and second friction clutch means.

14. The combination of claim 12 wherein said belt tensioner member includes a roller carried by said idler arm for engagement with said belt to effect tensioning thereof.

* * * * *